Figure 1:
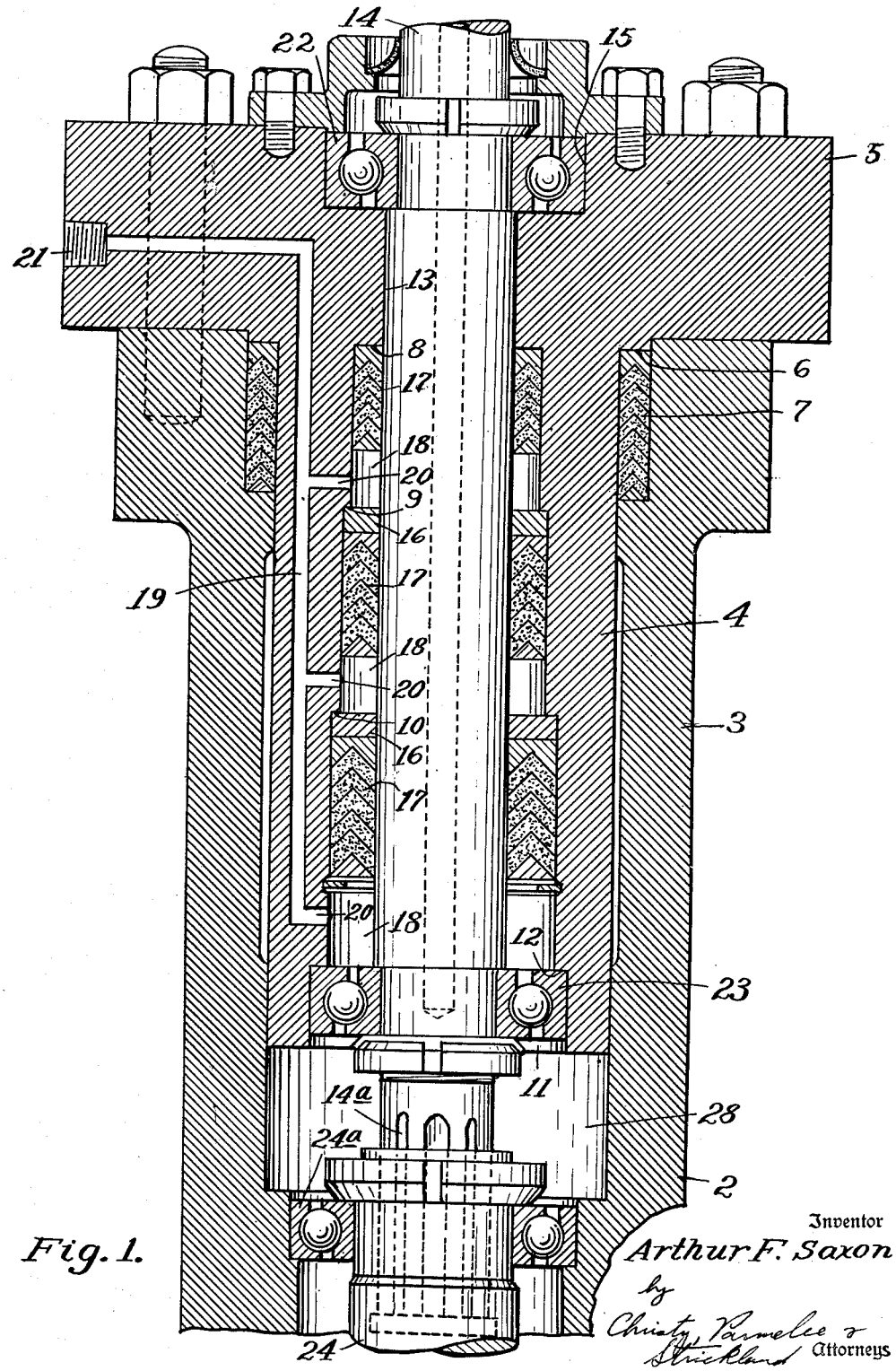

July 20, 1954     A. F. SAXON     2,684,274
STUFFING BOX

Filed May 18, 1950     2 Sheets-Sheet 2

Inventor
Arthur F. Saxon
By Christy, Parmelee & Strickland
Attorneys

Patented July 20, 1954

2,684,274

UNITED STATES PATENT OFFICE 2,684,274

STUFFING BOX

Arthur F. Saxon, Aspinwall, Pa., assignor, by mesne assignments, to Blaw-Knox Company, Pittsburgh, Pa., a corporation of Delaware Application May 18, 1950, Serial No. 162,650

6 Claims. (Cl. 308—187.1)

This invention is for an improvement in stuffing boxes, and especially stuffing boxes designed for use with high pressures and wherein a fluid-tight lubricated seal is provided about a moving part such as an agitator shaft, reciprocating piston rod, or the like.

While my invention is, as indicated above, applicable for use in various types of equipment, it will be hereinafter described for purposes of illustration as applied to the driving of an agitator shaft in a high pressure autoclave from a drive means located outside the autoclave so that a power-transmitting shaft must extend from the exterior to the interior of the autoclave, and must therefore be provided with a stuffing box. While so particularly described, it will be understood that the invention is not restricted to such use.

In an apparatus of the type to which the present invention pertains, there will generally be atmospheric pressure outside the autoclave or other equipment and high pressures, perhaps of the order of several hundred or several thousand pounds per square inch inside the same. Provision of a satisfactory stuffing box for such equipment has always provided a difficult problem.

It has heretofore been found desirable to provide two stuffing boxes in apparatus of this kind, the inner one being subject to the pressure in the autoclave on one side and to the pressure of lubricant in a space above it, which lubricant is preferably at a higher pressure than that in the autoclave. The inner packing therefore is subject only to the differential between the autoclave and the lubricant pressure. This is shown in Patent No. 2,398,944 granted April 23, 1946, to George E. Kopetz. The outer stuffing box then confines the lubricant, and is subject to the differential pressure between the oil pressure on the inner side and atmospheric pressure on the outside. In very high pressure equipment this may result in the breakdown of the packing and the scoring of the shaft with consequent failure of the equipment. The packing most directly exposed to the full oil pressure invariably is the part that fails. The present invention provides a multi-stage packing, preferably with lubricant between stages serving to relieve some of the overload and distribute the pressure to different bodies of the multi-stage packing.

The present invention has for its further object to provide a multi-stage stuffing box of cartridge form that may be easily inserted and removed. More specifically my invention further provides a packing and drive shaft assembly which can be made in the shop as a complete assembly and removed as a unit for replacement or servicing.

Figure 2:
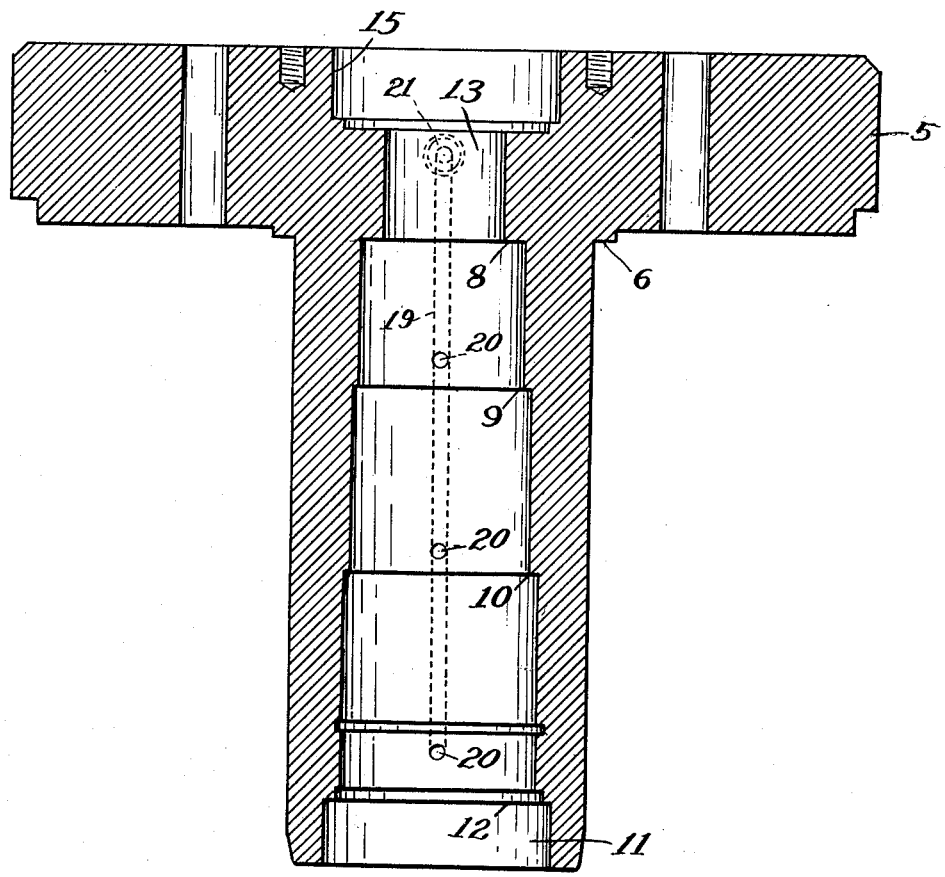

My invention may be more fully understood by reference to the accompanying drawings, in which:

Fig. 1 is a vertical section through the "nozzle" or drive shaft accommodating portion of an autoclave or the like, a packing embodying my invention being shown also in vertical section; and Fig. 2 is a vertical section through the cartridge with the packing elements removed therefrom.

In the drawings, the autoclave or other pressure vessel is not shown, but it is provided with a hollow extension or receptacle often called a nozzle 3, through which the drive shaft of an agitator or other motion-transmitting shaft is adapted to pass, and which is designed to receive the packing, the lower end 2 of the nozzle being usually integral with the top or cover of the vessel.

According to my invention, the stuffing box is of a so-called cartridge type, and it comprises a metal sleeve 4 which has a close working fit on the interior of the receptacle or nozzle 3. It is shown as having an integral flange 5 at its upper end. On the under side of the flange 5 is a projecting face or shoulder 6 that bears against the packing sleeve 7 recessed into the end of the nozzle or receptacle 3, and which is illustrated as a chevron type of packing. The sleeve itself may be secured to the top of the nozzle by bolts (not shown), and since the sleeve does not rotate in the receptacle, the single stage packing 7 at this point is adequate to form a seal. It serves the purpose of a more conventional form of gasket.

The interior of the sleeve is of upwardly-diminishing diameter, as may be clearly seen from Fig. 2. Preferably the bore decreases in diameter in steps from the lower or inner end to the upper or outer end, so that there are a succession of shoulders on the interior of the bore, these shoulders being designated 8, 9 and 10, and in the innermost or lowered end of the sleeve is still another enlargement or well 11, with a shoulder at 12. The uppermost portion of the opening designated 13 is of a diameter such as to have a working fit with the shaft which passes therethrough, and which shaft in Fig. 1 is designated 14. The outer face of the sleeve is preferably countersunk to provide a well 15.

Abutting against the shoulders 9 and 10 are thrust collars or separating rings 16. Each collar 16 supports on its inner face a packing body such as a chevron packing 17, but in lieu of a chevron packing, any other well-known form of packing may be used. There is also a packing such as a chevron packing 17' against the innermost shoulder 8. The thrust rings of course are of a proper diameter to be received in the sleeve and supported on their respective shoulders, and they are restrained against endwise movement outwardly by contact with the shoulders. Each thrust ring has a central opening through which the shaft passes.

There is thus provided within the sleeve a multiple stage packing, with each stage of packing separately supported on a shoulder against outward movement, so that the pressure on one body is not transmitted to the next. There may be as many of these stages as are required for good engineering practice.

Each packing is separated from the preceding thrust collar or separator ring, there being a space 18 in which lubricant may be received. The sleeve is shown as having passageways adapted to deliver lubricant to the several spaces 18. In Fig. 1 of the drawings, the sleeve is shown as having a passageway 19 drilled lengthwise therethrough, and a lateral or radial connection 20 leads from the passage 19 into each of the spaces 18. The lower end of the passageway 19 is open and the upper end of the passage 19 connects to a threaded recess 21 into which a lubricant nipple can be screwed.

In the preferred embodiment of the invention for use in driving the agitators of autoclaves and the like, the well 15 is provided with an antifriction bearing 22, and there is another antifriction bearing 23 in the inner or lower end portion 11 of the sleeve. The shaft which transmits motion from a motor on the exterior of the autoclave to the agitator on the inner end is preferably a short shaft having splines at its inner end portion 14a, and this splined end of the shaft is fitted into the end of the agitator shaft 24, which agitator shaft is separately supported in its own bearings inside the autoclave, and there is a stuffing box, not shown, below the bearing 24a, as described in said Kopetz patent.

Thus the whole assembly, including the sleeve, the packings, the shaft 14, and the bearings for the shaft 14, constitute a shop assembly that can be placed into the autoclave and removed from time to time for repair or replacement.

Lubricant under pressure, preferably higher than the pressure in the autoclave, is delivered through a passage, not shown, but as described in the Kopetz patent, and will fill the space 28, and can flow into the passage 19 and out the connection at 21, the lubricant at the same time filling the spaces 18. Other means of supplying lubricant may be used.

Thus the present invention provides a multi-stage cartridge type stuffing box for pressure vessels in which each stage is separated by a rigid support from the next stage, and wherein there may be lubricating system with provision for lubricating the shaft at each stage. There being lubricant on each side of the several packing bodies, except the outermost one, the differential pressure across them is distributed and the load on the packings is also distributed. It will also be noted that the collars or separators, like the bore on the interior of the sleeve, are of smaller diameter progressively from the inner end to the outer end, so that the effect of pressure is to hold the separator rings against their respective shoulders, and the load on one is not transmitted to the next one.

The stuffing box herein illustrated is especially applicable for use with a system such as shown in the copending application of James R. Shields, Serial No. 162,648, filed May 18, 1950, wherein provision is made for the progressive reduction of the pressure of the lubricant in the several stages, so that the pressure in each lubricating space 18 is lower by a predetermined amount than the pressure in the preceding space and thereby definitely distributes the load to each stage of the packing.

While I have shown and described one preferred embodiment of my invention, it will be understood that various changes and modifications may be made therein, and that the invention is applicable as hereinbefore stated, to various equipment other than autoclaves.

I claim:

1. A high pressure lubricated stuffing box for a rotary shaft comprising a sleeve adapted to be fitted into and secured on a stuffing box receptacle, a series of annular bores of different uniform diameters on the inside of the sleeve which surround the shaft within the stuffing box to be packed, an annular packing body within each of the bores and extending from the wall of the bores to the surface of the shaft, one end of each packing body resting against a rigid support in one end of its respective bore and each other end of the packing body being spaced inwardly from the opposite end of the bore to provide a chamber for lubricant, and passages in the sleeve communicating with the chambers and arranged to conduct lubricant under pressure into the chambers to compress the packing against said support and shaft.

2. The stuffing box defined in claim 1 in which succeeding annular bores in the sleeve have decreasing cross-sectional areas from the inside to the outside of the stuffing box with a substantial shoulder between adjoining bores and a thrust ring closely fitted between the inner diameter of each bore and the outside of the shaft to form abutments for supporting the packing bodies.

3. The stuffing box defined in claim 1 in which succeeding annular bores in the sleeve have decreasing cross-sectional areas from the inside to the outside of the stuffing box, and the oil passageways in the sleeve are arranged to deliver oil under the same pressure to each chamber behind the packing bodies to develop a packing pressure of the bodies against the shaft in accordance with the cross-sectional area of the bodies.

4. The stuffing box defined in claim 3 in which a substantial shoulder is formed between adjoining bores, and thrust rings closely fitted between the inside face of the bores, and the outside face of the shaft serving as abutments for supporting the packing bodies.

5. The stuffing box defined in claim 1 in which the sleeve with the packing bodies, a shaft and oil passageways are connected together as a self-contained unit and a flange is formed on the outside of the sleeve and connecting devices are used for connecting the unit to the high pressure vessel to be sealed.

6. The stuffing box unit defined in claim 5 in which the shaft is journaled in bearings mounted at opposite ends of the sleeve, the inside bearing being in communication with an oil chamber within the stuffing box.

References Cited in the file of this patent

UNITED STATES PATENTS

| Number | Name | Date |
| --- | --- | --- |
| 641,825 | Boulet | Jan. 23, 1900 |
| 1,996,779 | Wheeler | Apr. 9, 1935 |
| 2,017,290 | Parker | Oct. 15, 1935 |
| 2,320,589 | Gruetjen | June 1, 1943 |
| 2,332,150 | Huff | Oct. 19, 1943 |

FOREIGN PATENTS

| Number | Country | Date |
| --- | --- | --- |
| 591,361 | Germany | Jan. 20, 1934 |